Sept. 4, 1928.
V. D. HUGHEY ET AL
1,683,190
PAN LIFTER
Filed July 7, 1927
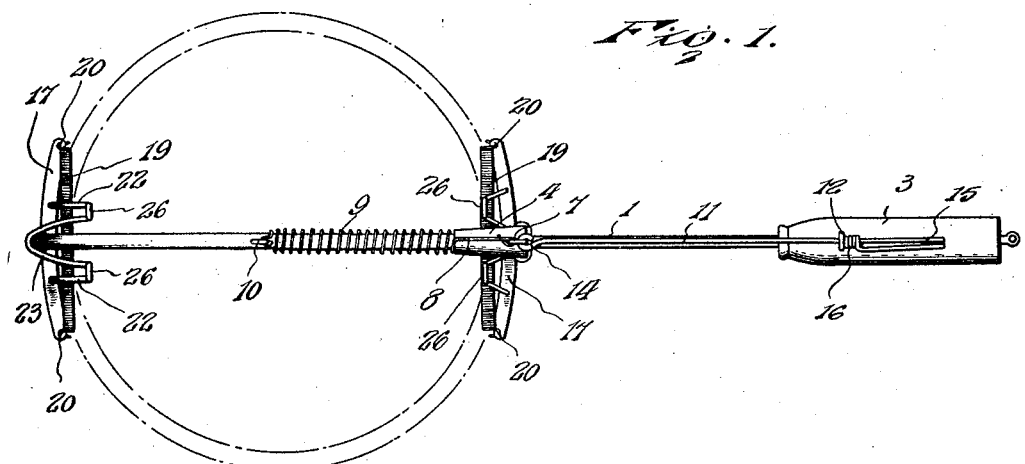
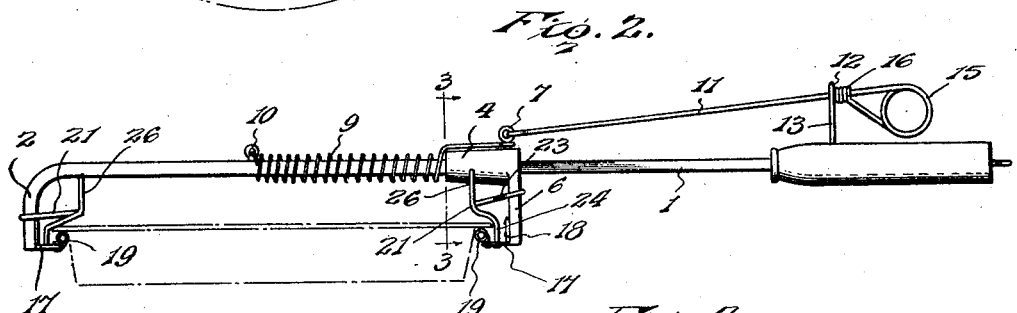
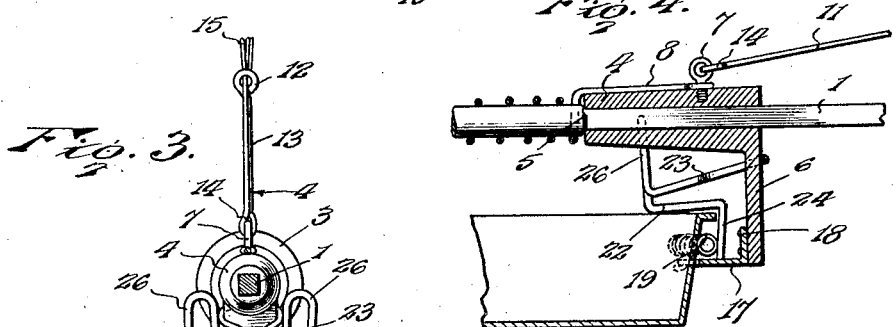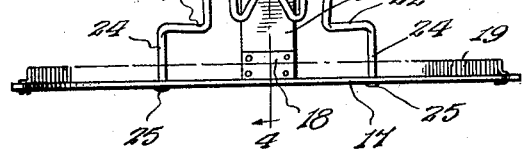
Inventors
V. D. Hughey.
O. R. Mullins.
I. M. Hughey.
By Lacey & Lacey, Attorneys Patented Sept. 4, 1928.

1,683,190

UNITED STATES PATENT OFFICE.

VIRGIL D. HUGHEY, OSCAR R. MULLINS, AND IRVIN M. HUGHEY, OF CALHOUN, GEORGIA.

PAN LIFTER.

Application filed July 7, 1927. Serial No. 204,056.

This invention relates to kitchen utensils and more particularly to a pan lifter by means of which a pie pan or the like may be placed in or removed from an oven without danger of burning the hands or arms upon a hot pan or portions of a hot oven.

One object of the invention is to provide a pan lifter so constructed that a pan may be placed in or removed from an oven without it being necessary to extend a hand and portion of an arm into the oven thereby preventing the hand and arm from being exposed to excessive heat as well as preventing danger of burns being received by contact with a hot pan or portion of an oven.

Another object of the invention is to provide the pan lifter with improved pan-engaging jaws yieldably held in position to grip a pan and including portions to bear against the outer surfaces of the side walls of the pan and also portions to extend across the upper edges of the walls.

Another object of the invention is to prevent the jaws from slipping out of engagement with a pan but allow them to be easily released from the pan.

Another object of the invention is to allow the pan holder to be used for engaging pans of different sizes.

The invention is illustrated in the accompanying drawing, wherein

Figure 1 is a top plan view of the improved pan lifter with a pan to be engaged thereby indicated by dotted lines;

Fig. 2 is a view showing the improved pan lifter in side elevation;

Fig. 3 is a transverse sectional view through the improved pan lifter taken on the line 3—3 of Fig. 1, and Fig. 4 is a fragmentary sectional view taken on the line 4—4 of Fig. 3.

The pan lifter constituting the subject-matter of this invention includes a shank or staff 1 consisting of a metal rod having one end portion bent downwardly to provide an arm 2 and at its other end carrying a handle 3 of wood or any other desired material. By referring to Fig. 4, it will be seen that the forward portion of the staff 1 is circular in cross section, whereas the rear portion is rectangular. This prevents the slide 4 from having rotary motion upon the staff and limits its forward movement thereon by engagement with the shoulder 5 formed at the junction of the two portions of the staff.

The slide is preferably cast in one piece although other methods of manufacturing may be adopted if seen fit and is provided with a depending arm 6 which extends substantially parallel to the arm 2 at the forward end of the staff. An eye 7 projects upwardly, as shown in Figs. 2 and 4, and is engaged by an end portion 8 of a coiled spring 9 which spring is disposed about the staff with its forward end engaged with an eye 10. The spring is under tension when engaged with the two eyes 7 and 10 and constitutes resilient means yieldably resisting movement of the slide rearwardly upon the staff. An acutating rod 11 which extends longitudinally of the staff is slidably received in the eye 12 of a guide 13 carried by the handle 3 and has its forward end formed with a hook or eye 14 loosely engaged in the eye 7 and its rear end portion bent to form a finger-engaging loop 15. After forming the loop 15, the extreme end portion of the wire from which the actuating rod 11 is formed is twisted about the rod, as shown at 16, thereby providing a brace which will prevent the loop 15 from being distorted when the actuating rod is drawn upon to move the slide rearwardly upon the staff.

The depending arms 2 and 6 each carries a pan-engaging jaw. These jaws are of a duplicate construction and each includes a cross bar 17 formed of flat sheet metal which is curved longitudinally, as shown in Fig. 1, and intermediate its ends provided with an upstanding ear or tongue 18 riveted or otherwise rigidly secured against its carrying arm. A coiled spring 19 which may be referred to as a yieldable pan-engaging element extends longitudinally of the cross bar 17 with its ends engaged in openings 20 formed in the ends of the cross bar, and this spring is so disposed with respect to the cross bar that when pressure is applied to it it may move over the upper surface of the cross bar and thereby assume a longitudinally curved contour and have snug fitting engagement with the walls of a pie pan or the like. Each jaw also includes a yoke 21 which is formed of wire bent intermediate its length to provide arms 22 which project from the cross bar in order to extend across the upper edge of the walls of the pie pan and are joined by a substantially U-shaped anchoring member 23, a portion of which is disposed in encircling relation to the carrying arm, as shown clearly in Fig. 3. The depending ends 24 of the wire from which the yoke is formed are passed through openings formed in the cross bar and riveted against displacement, as shown at 25, so that the yoke will be securely held in place and the joined end portions of the arms 22 and anchoring member 23 are bent upwardly, as shown at 26, so that there will be no danger of them becoming embedded in a cake or pie with resulting damage thereto when placing a pan in an oven or removing a pan from the oven.

When the pan lifter is in use, it is held by the handle and a finger engaged in the loop 15 so that the slide may be drawn to move its jaw away from the jaw carried by the depending arm of the staff. After the jaws have been separated a sufficient distance to receive the pie pan between them, they are moved into place with the staff extending diametrically across the pan and the jaws disposed at opposite sides thereof. The pulling action exerted upon the actuating rod 11 is relieved and the spring 9 will draw the slide toward its original position and as this takes place the two springs will engage the walls of the pie pan. This causes the springs to be bowed longitudinally, as shown in Fig. 4, so that the jaws have close fitting engagement with the walls of the pan. The arms 22 extend across the upper edges of the walls of the pan and the pan will be very firmly gripped between the two jaws. When so engaged, the pan may be lifted with the pan holder and either placed in or removed from an oven without it being necessary to pass a hand and portion of an arm into the hot oven thereby doing away with the danger of a hand or arm being subjected to excessive heat or burnt by contacting with a hot pan or portion of an oven. In order to release the pan, it is merely necessary to grasp the actuating rod by its loop and exert pulling action which will draw the slide rearwardly upon the staff a sufficient distance to permit the pan holder to be moved upwardly out of engagement with the pan.

Having thus described the invention, we claim:

1. A pan lifter comprising a shank having a depending supporting arm at one end, a slide carried by said shank and movable longitudinally thereof, and pan-engaging jaws carried by said slide and arm, each jaw including a cross bar and yieldable pan-engaging means carried by the cross bar.

2. A pan lifter comprising a shank having a depending supporting arm at one end, a slide carried by said shank and movable longitudinally thereof, the slide having a portion depending from the shank, and jaws carried by said arm and the depending portion of said slide, each jaw consisting of a cross bar and a pan-engaging spring extending longitudinally of the cross bar and having its ends secured to the cross bar.

3. A pan lifter comprising a shank having a depending supporting arm at one end, a slide carried by said shank and movable longitudinally thereof, the slide having a portion depending from the shank, jaws carried by said arm and the depending portion of said slide, one jaw including a horizontal cross bar secured intermediate its ends and curved longitudinally, a spring extending between and connected with the ends of said cross bar for yielding engagement with the walls of a pan, a yoke for extending across and engaging the upper edge of the pan wall, and actuating means for said slide.

4. A pan lifter comprising a shank having a depending supporting arm at one end, a slide carried by said shank and movable longitudinally thereof, pan-engaging jaws carried by said slide and arm, each including a cross bar and a coiled spring extending longitudinally of said cross bar and having its ends secured thereto, the spring constituting yieldable pan-engaging means, resilient means yieldably resisting movement of said slide away from said arm, and means for moving the slide away from the arm in opposition to the action of said resilient means.

5. A pan lifter comprising a shank having a depending supporting arm at one end, a slide carried by said shank and movable longitudinally thereof, the slide having a depending supporting arm, jaws carried by the supporting arms of said shank and slide and each including a rigid cross bar carried by a supporting arm transversely thereof and projecting from opposite sides thereof, a coiled spring extending longitudinally of said bar and spaced therefrom throughout the greater portion of its length and having its ends secured thereto, a pan-engaging yoke carried by said cross bar and having arms for extending across the upper edge of walls of a pan and actuating means for said slide.

6. A pan lifter comprising a shank having a depending supporting arm at one end, a slide carried by said shank and movable longitudinally thereof, jaws carried by said arm and slide for gripping portions of the walls of a pan disposed between the jaws and each including a rigid cross bar disposed horizontally and curved longitudinally, a coiled spring extending between and secured to the ends of said cross bar and constituting a yieldable pan-engaging element, a yoke carried by said cross bar and including pan-engaging arms and a support-engaging portion connecting the same, and actuating means for said slide.

7. A pan lifter comprising a shank having a depending arm, a slide carried by said shank and slidable thereon towards and away from said arm, the slide having a depending arm, jaws carried by said arms for gripping a pan disposed between the jaws, and yokes carried by said jaws to engage over the walls of a pan gripped between the jaws, each yoke consisting of a strand bent intermediate its length to provide a collar fitting about an arm and having portions projecting therefrom over the cooperating jaw and bent back upon themselves and downwardly and secured to the jaw.

In testimony whereof we affix our signatures.

VIRGIL D. HUGHEY. [L. S.]
OSCAR R. MULLINS. [L. S.]
IRVIN M. HUGHEY. [L. S.]